United States Patent
Lee (10) Patent No.: US 10,658,638 B2
(45) Date of Patent: May 19, 2020

(54) RECHARGEABLE BATTERY

(71) Applicant: Samsung SDI Co., Ltd., Yongin-si, Gyeonggi-do (KR)

(72) Inventor: Hyun-Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 449 days.

(21) Appl. No.: 15/352,412

(22) Filed: Nov. 15, 2016

(65) Prior Publication Data

US 2017/0279098 A1 Sep. 28, 2017

(30) Foreign Application Priority Data

Mar. 22, 2016 (KR) .......................... 10-2016-0034134

(51) Int. Cl.
*H01M 2/12* (2006.01)
*H01M 2/04* (2006.01)
*H01M 10/0525* (2010.01)

(52) U.S. Cl.
CPC ....... *H01M 2/1241* (2013.01); *H01M 2/0404* (2013.01); *H01M 2/0473* (2013.01); *H01M 2/12* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2005/0287422 A1 | 12/2005 | Kim et al. | |
| 2007/0154782 A1* | 7/2007 | Cho | H01M 2/0207 429/56 |
| 2010/0086835 A1 | 4/2010 | Kim | |
| 2011/0206957 A1 | 8/2011 | Byun | |
| 2016/0028057 A1 | 1/2016 | Kanamori et al. | |

FOREIGN PATENT DOCUMENTS

| | | |
|---|---|---|
| JP | 2003-208882 A | 7/2003 |
| JP | 2005-259413 A | 9/2005 |
| KR | 10-2008-0005772 A | 1/2008 |
| KR | 10-2009-0081174 A | 7/2009 |

OTHER PUBLICATIONS

EPO Extended Search Report dated Jul. 20, 2017, for corresponding European Patent Application No. 17154137.8 (7 pages).
EPO Office Action, dated Mar. 21, 2019, for corresponding European Patent Application No. 17 154 137.8 (5 pages).

* cited by examiner

*Primary Examiner* — Sin J Lee
(74) *Attorney, Agent, or Firm* — Lewis Roca Rothgerber Christie LLP (57) ABSTRACT

A rechargeable battery according to an exemplary embodiments includes: an electrode assembly; a case configured to accommodate the electrode assembly and having an opening at one side thereof; and a cap assembly including: a cap plate configured to close and seal the opening of the case, the cap plate having a vent portion and defining a vent opening that is configured to discharge an internal gas generated inside the case to the outside of the case, the vent portion comprising: a vent plate configured to close and seal the vent opening; and a bending portion that is raised from the vent plate; and an electrode terminal at an upper portion of the cap plate and electrically connected to the electrode assembly.

8 Claims, 6 Drawing Sheets

RECHARGEABLE BATTERY

CROSS-REFERENCE TO RELATED APPLICATIONS

This application claims priority to and the benefit of Korean Patent Application No. 10-2016-0034134, filed on Mar. 22, 2016 in the Korean Intellectual Property Office (KIPO), the entire contents of which are incorporated herein by reference.

BACKGROUND

1. Field

Embodiments of the present invention relate generally to a rechargeable battery.

2. Description of the Related Art

A rechargeable battery differs from a primary battery in that it is designed to be repeatedly charged and discharged, while the latter is not designed to be recharged. The rechargeable battery may be used for small portable electronic devices, such as mobile phones, notebook computers, and camcorders, or may be widely used as a motor-driving power source for a hybrid vehicle, etc.

The rechargeable battery includes an electrode assembly, which includes a positive electrode, a negative electrode, and a separator interposed between the positive electrode and the negative electrode. The electrode assembly is accommodated in a case to perform charging and discharging operations, and the case is provided with terminals that are used to supply or draw out a current. The case may be formed of a metal plate or pouch.

The case of the rechargeable battery is provided with a vent (or vent portion). A vent plate of the vent portion is connected to a lower portion of a vent hole provided in the case. Because the vent plate is formed to be thinner than the case, when internal pressure of the case increases due to overcharge, etc., the vent plate is broken before other portions such that an internal gas of the rechargeable battery may be discharged to ensure (or improve) safety of the rechargeable battery.

However, because a thickness of the vent plate is very thin, when the vent plate is connected to the case, damage may occur thereto. Moreover, when the rechargeable battery is dropped or a small external impact is applied to the rechargeable battery, a crack may occur in the vent plate, or the vent plate may be broken. Accordingly, due to the damaged vent plate, reliability in terms of lifespan of the rechargeable battery may be reduced.

The above information disclosed in this Background section is only for enhancement of understanding of the background of the described technology and therefore it may contain information that does not form prior art.

SUMMARY

Embodiments of the present invention provide a rechargeable battery having a vent portion that may not be easily cracked or broken when externally impacted due to dropping, etc., or when the vent portion is connected to a case.

An exemplary embodiment provides a rechargeable battery including: an electrode assembly; a case configured to accommodate the electrode assembly and having an opening at one side thereof; and a cap assembly including: a cap plate configured to close and seal the opening of the case, the cap plate having a vent portion and defining a vent opening that is configured to discharge an internal gas generated inside the case to the outside of the case, the vent portion including: a vent plate configured to close and seal the vent opening; and a bending portion that is raised from the vent plate; and an electrode terminal at an upper portion of the cap plate and electrically connected to the electrode assembly.

The vent plate may include a connecting portion located below the cap plate at the vent opening, and a rupture portion enclosed by the bending portion and having a notch.

The bending portion may be located between an outer periphery of the vent opening and the notch.

A distance between a center of the bending portion and an outer periphery of the vent opening may be greater than a length of the connecting portion.

A height of the bending portion in a first direction may be less than a thickness of the cap plate in the first direction, and the height of the bending portion may be greater than a thickness of the vent plate in the first direction.

The bending portion may include a plurality of the bending portions.

The plurality of bending portions may be raised in a same direction.

The plurality of bending portions may be alternately raised in opposing directions.

The notch may be located near a center of the vent plate and may have a thickness that is less than a thickness of the rupture portion in an inside direction of the case.

The cap plate may define an insertion groove configured to receive the connecting portion of the vent plate and coupled with the connecting portion.

According to the exemplary embodiment, it is possible to prevent the vent plate from being damaged even when the vent plate is connected to the vent hole formed in the case, or reduce the likelihood thereof.

In addition, according to the exemplary embodiment, it is possible to reduce the possibility (or likelihood) of the vent plate being cracked or broken when the rechargeable battery is dropped, or when an external impact is applied to the rechargeable battery.

DETAILED DESCRIPTION

Embodiments of the present invention are described more fully hereinafter with reference to the accompanying drawings, in which exemplary embodiments of the invention are shown. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity. As those skilled in the art would realize, the described embodiments may be modified in various different ways, all without departing from the spirit or scope of the present invention.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
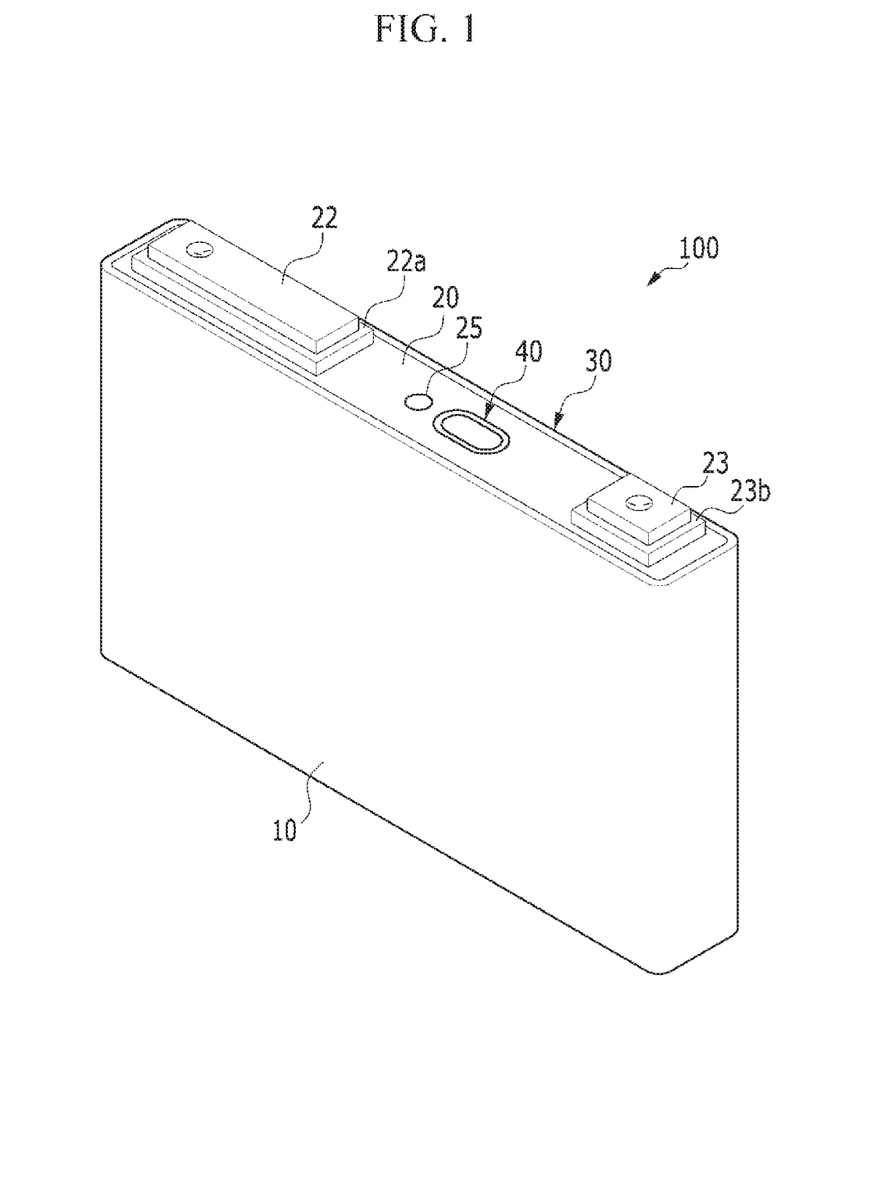
FIG. 1 illustrates a perspective view of a rechargeable battery according to an exemplary embodiment.

FIG. 1 illustrates a perspective view of a rechargeable battery according to an exemplary embodiment.

Referring to FIG. 1, a rechargeable battery 100 includes an electrode assembly through which a current is charged or discharged, a case 10 in which the electrode assembly is accommodated, and a cap assembly 30 combined to the case 10.

The rechargeable battery 100 according to the current exemplary embodiment is exemplarily described as being a lithium ion rechargeable battery having a prismatic shape. However, the present invention is not limited thereto, and the present invention may be applicable to various types of batteries such as a lithium polymer battery, a cylindrical battery, and the like.

The case 10 has a substantially cuboid shape, having an opening at one side thereof. The case 10 may be made of a metal such as aluminum, stainless steel, etc.

The cap assembly 30 includes a cap plate 20 that covers the opening of the case 10 and connects the inside and outside of the case 10 and includes a vent portion 40, and an electrode terminal 22, 23 that protrudes away from the cap plate 20 and is electrically connected to the electrode assembly.

The cap plate 20 has a long plate shape that extends along one direction, and is combined to the opening of the case 10. The electrode terminal includes a first terminal 22 and a second terminal 23, and protrudes above the cap plate 20.

The cap plate 20 is provided with a sealing cap installed at an electrolyte injection opening 25 and the vent portion 40, which is configured to be opened (e.g., opened at a predetermined pressure). The vent portion 40 may be formed to be oval (e.g., may be formed to have an oval shape). The vent portion 40 may be formed to be larger than the electrolyte injection opening 25. The vent portion 40 may be formed to have a size in which the inside of the case 10 communicates with the outside thereof such that an internal gas generated inside the case may be easily discharged. Moreover, the vent portion 40 may be positioned between the first terminal 22 and the second terminal 23.

The electrode terminal includes the first terminal 22 and the second terminal 23 connected to the negative electrode and the positive electrode, respectively. The first terminal 22 may have a rectangular plate shape. An insulating member 22a for electrically isolating the first terminal 22 and the cap plate 20 may be installed between the first terminal 22 and the cap plate 20.

The second terminal 23 may have a rectangular plate shape. A connecting member 23b for electrically connecting the second terminal 23 and the cap plate 20 may be installed at a lower portion of the second terminal 23. Accordingly, the cap plate 20 and the case 10 may be electrically coupled to an electrode that is electrically connected to the second terminal 23, for example, to the positive electrode.

The electrode assembly is accommodated in the case 10 to be closed and sealed by the cap assembly 30. An electrolyte solution may be injected into the case 10 through the electrolyte injection opening 25 formed in the cap plate 20.

Figure 2:
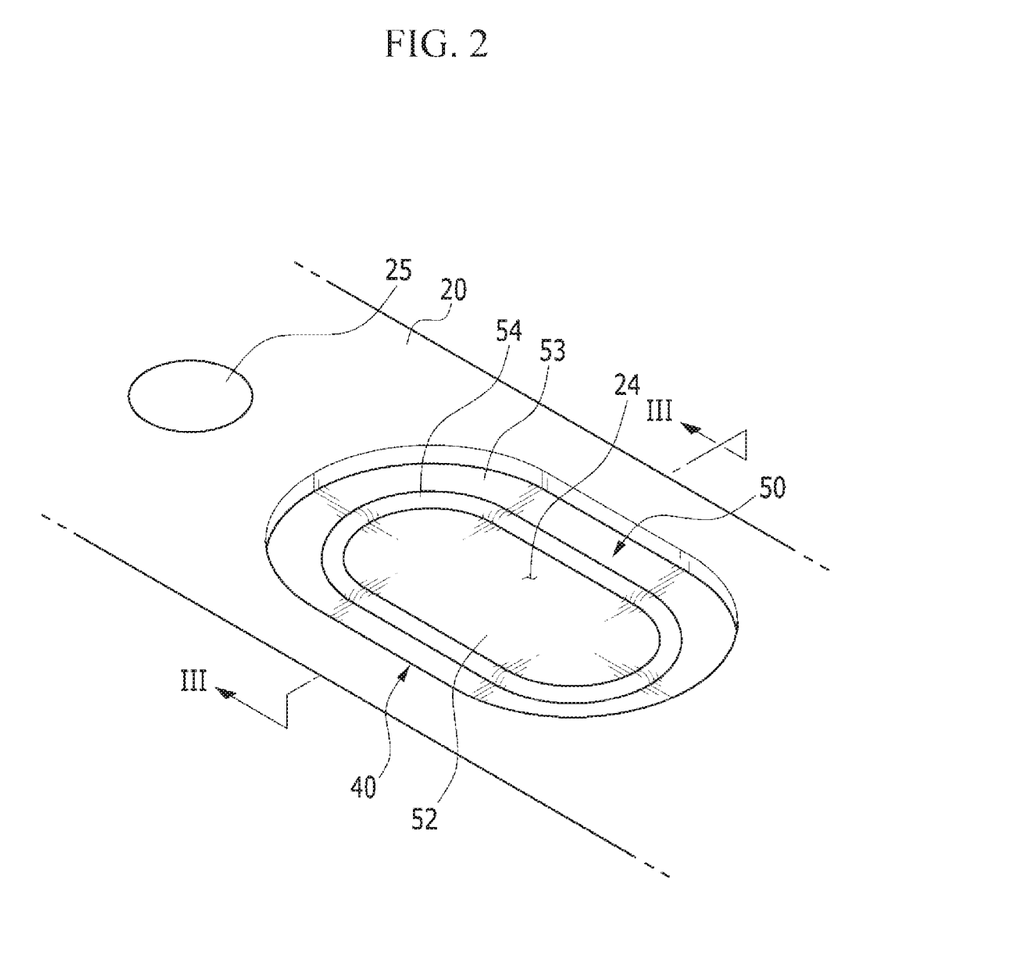
FIG. 2 illustrates an enlarged perspective view of a vent portion of the rechargeable battery shown in FIG. 1.

FIG. 2 illustrates an enlarged perspective view of the vent portion of the rechargeable battery shown in FIG. 1.

Figure 3:
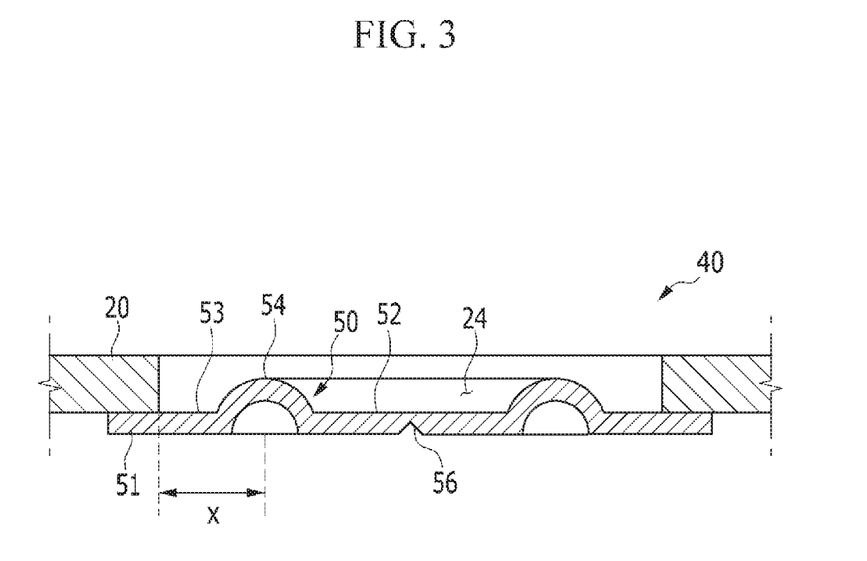
FIG. 3 illustrates a cross-sectional view taken along the line III-Ill of the vent portion of the rechargeable battery shown in FIG. 2.

Referring to FIG. 2, the cap plate 20 may include a vent opening (or vent hole), and the vent portion may include a vent plate 50 that is connected to the cap plate 20 at the vent hole 24 and is formed with a notch 56 (refer to FIG. 3).

The vent hole 24 may be formed in the cap plate 20 to have an oval shape. However, the vent hole 24 is not limited to the oval shape, and it may be formed to have any suitable shape known to those skilled in the art, such as a quadrangular shape or a circular shape. A size of the vent hole 24 may vary depending on a capacity of the rechargeable battery 100 (refer to FIG. 1).

The vent plate 50 may be connected to the cap plate 20 to close and seal the vent hole 24. The vent plate 50 is connected to the cap plate 20 around the vent hole 24 at a location below the vent hole 24. When the internal pressure of the case 10 (refer to FIG. 1) exceeds a predetermined pressure, the vent plate 50 is broken, and thus the inside of the case 10 is opened to the outside through the vent hole 24. Accordingly, gas and the like generated in the case 10 may be discharged to the outside through the vent hole 24.

The vent plate 50 is disposed along a periphery (or circumference) of the vent hole 24, and it may include a bending portion 54 provided at (or in) the inside thereof and spaced (e.g., spaced apart) from the periphery (or circumference) of the vent hole 24. The bending portion 54 may be formed by being raised from the vent plate 50. For example, the bending portion 54 of the vent plate 50 may be formed by being pressed by a press machine and/or the like. A raised height of the bending portion 54 may be less than a thickness of the cap plate 20. In addition, the raised height of the bending portion 54 may be less than a thickness of the vent plate 50. Accordingly, the bending portion 54 is raised above the vent plate 50, but it may be positioned below the upper surface of the cap plate 20. For example, the bending portion 54 may not protrude above the upper surface of the cap plate 20 of the rechargeable battery 100.

As described above, the bending portion 54 is disposed inside the vent hole 24 while being spaced from (e.g., spaced apart from) an outer periphery (or outer circumference) of the vent hole 24, and the bending portion 54 may be formed to be gently raised. Because the bending portion 54 is raised (or gently raised), it may efficiently deal with (or absorb) stress and the like generated or applied in a planar direction of the vent plate 50.

The bending portion 54 may be raised in an upper direction of the cap plate 20. For example, the bending portion 54 may be raised in an outside direction of the rechargeable battery 100 (or raised outwardly). The bending portion 54 may be raised to be convex along the vent hole 24.

However, in some embodiments, the bending portion 54 may be raised in a lower direction of the cap plate 20. For example, the bending portion 54 may be raised in an inside direction of the case 10 of the rechargeable battery 100 (or raised inwardly toward the inside of the case 10). For example, the bending portion 54 may be formed to be concave along the vent hole 24.

A rupture portion 52 may be provided inside the bending portion 54 (or may be enclosed the bending portion 54). For example, the rupture portion 52, which is disposed to be spaced from (or spaced apart from) the outer periphery (or outer circumference) of the vent hole 24, corresponds to the inside of the bending portion 54 along a closed curve. As the internal pressure of the case 10 increases, the rupture portion 52 may be ruptured or broken. That is, a rupture may occur inside the bending portion 54.

A thickness of the rupture portion 52 may be set depending on (or according to) a size of the rechargeable battery 100 or the charging and discharging capacity of the rechargeable battery 100. For example, when the charging capacity of the rechargeable battery 100 is high (or large), risk of explosion thereof increases, thus the rupture portion 52 may be thinly formed to be ruptured (or quickly ruptured or immediately ruptured) when the internal pressure of the case 10 rapidly increases.

The notch 56 may be formed at the rupture portion 52. The notch 56 may be formed at a lower portion of the rupture portion 52 corresponding to the inside direction of the case 10. When the notch 56 is exposed to the outside, foreign objects may attach (or become attached) to the notch 56 such that they cause contamination, thereby deteriorating durability. Further, the notch 56 may not be ruptured in time due to the foreign objects attached on the notch 56. Accordingly, it is possible to improve durability and reliability for safety of the rechargeable battery 100 by forming the notch 56 at the lower portion of the rupture portion 52.

FIG. 3 illustrates a cross-sectional view taken along the line III-III of the vent portion of the rechargeable battery shown in FIG. 2.

Referring to FIG. 3, the vent plate 50 includes a connecting portion 51 connected to the cap plate 20, the bending portion 54 disposed to be spaced from (or spaced apart from) the outer periphery (or outer circumference) of the vent hole 24, and the rupture portion 52 disposed inside the bending portion 54.

The connecting portion 51 of the vent plate 50 may be connected to the cap plate 20 around the vent hole 24. The connecting portion 51 may be welded to the cap plate 20. When the cap plate 20 and the connecting portion 51 are welded, welding stress may occur at the bending portion 54 in the planar direction of the vent plate 50. The raised bending portion 54 may prevent the rupture portion 52 from being damaged, or reduce the likelihood thereof. Because the bending portion 54 is formed by partially bending the vent plate 50, the bending portion 54 may flexibly deal with (or absorb) the stress occurring in the planar direction of the vent plate 50. More specifically, when the stress is generated or applied in the outside direction of the vent hole 24, the stress is absorbed in the bending portion 54 while the bending portion 54 is spread, thereby protecting the rupture portion 52. When the stress is generated or applied in the inside direction of the vent hole 24, the stress is absorbed in the bending portion 54 while the bending portion 54 is compressed, thereby protecting the rupture portion 52.

Accordingly, the bending portion 54 disposed along (or outside of) the rupture portion 52 provides a buffer between the connecting portion 51 and the rupture portion 52. The connecting portion 51 may be welded to the cap plate 20 by about 1 mm.

A center of the bending portion 54 may be spaced from (or spaced apart from) the vent hole 24 by a first separation distance X. For example, the first separation distance X corresponds to a distance from the cap plate 20 to the center of the bending portion 54 in the opened vent hole 24.

The first separation distance X may be greater than an overlapped length of the cap plate 20 and the connecting portion 51. The vent plate 50 may be welded and bonded to the cap plate 20 around the vent hole 24 at a location below the vent hole 24. As described above, the connecting portion 51 may be welded to the cap plate 20 by a range of about 1 mm. In some embodiments, the first separation distance X is greater (or longer) than a welded length of the connecting portion 51.

A first region 53 is disposed between the bending portion 54 and the vent hole 24. The first region 53 is disposed outside of the bending portion 54. As the first region 53 increases, the region of the rupture portion 52 decreases, but a resistance force against the stress may increase. As such, the first region 53 may provide (or serve as) a buffer region. When there is a tendency for the rupture portion 52 to be damaged (e.g., frequently damaged) while the connecting portion 51 and the cap plate 20 are being connected, it is possible to prevent the rupture portion 52 from being damaged by increasing the first region 53, or reduce the likelihood thereof.

In some embodiments, the first separation distance X from the center of the bending portion 54 to the outer periphery (or outer circumference) of the vent hole 24 is greater than the welded length of the cap plate 20 welded to the connecting portion 51. For example, in some embodiments, the first region 53 is greater than the length of the connecting portion 51. The bending portion 54 may be disposed between the notch 56 formed at or near a central portion of the rupture portion 52 and the outer periphery (or circumference) of the vent hole 24.

As described above, the rupture portion 52 may be disposed inside the bending portion 54. The rupture portion 52 is provided with the notch 56, and the notch 56 may be formed to have a thickness that is less than the thickness of the rupture portion 52. The notch 56 may be disposed at or near the center of the rupture portion 52. Particularly, when the notch 56 is disposed at the lower portion of the rupture portion 52, the notch 56 cannot be seen from the outside of the rechargeable battery 100 (refer to FIG. 1).

The thickness of the rupture portion 52 may be the same as that of the connecting portion 51 of the vent plate 50. Accordingly, the notch 56, which is formed to have a smaller thickness than the rupture portion 52, may be ruptured by the internal pressure of the case 10. However, when the explosion risk of the rechargeable battery 100 is high (or very high), the thickness of the rupture portion 52 is formed to be less than the thickness of the connecting portion 51 of the vent plate 50 so that the rupture portion 52 may be ruptured along with the notch, thereby efficiently protecting against the explosion risk, or reducing the likelihood of explosion.

Figure 4:
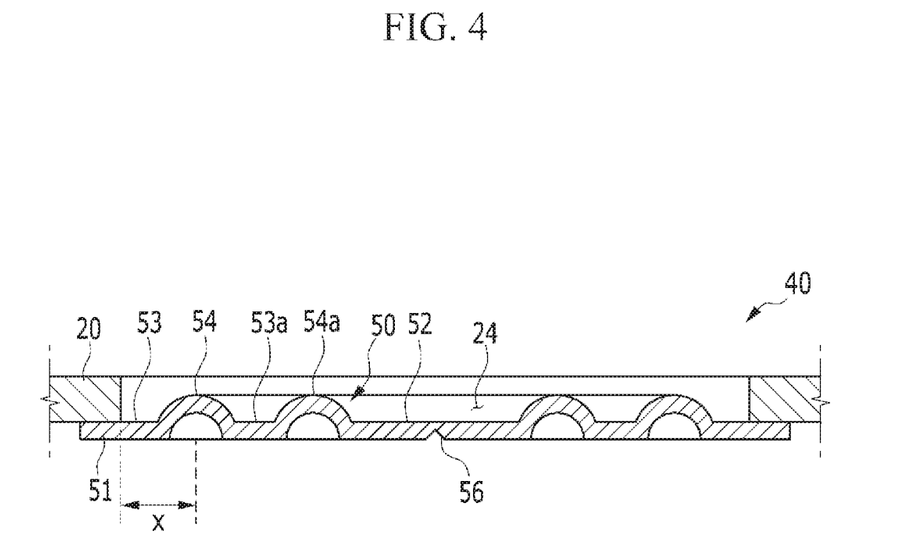
FIG. 4 illustrates a cross-sectional view of a first exemplary variation of the vent portion of the rechargeable battery shown in FIG. 1.
Figure 5:
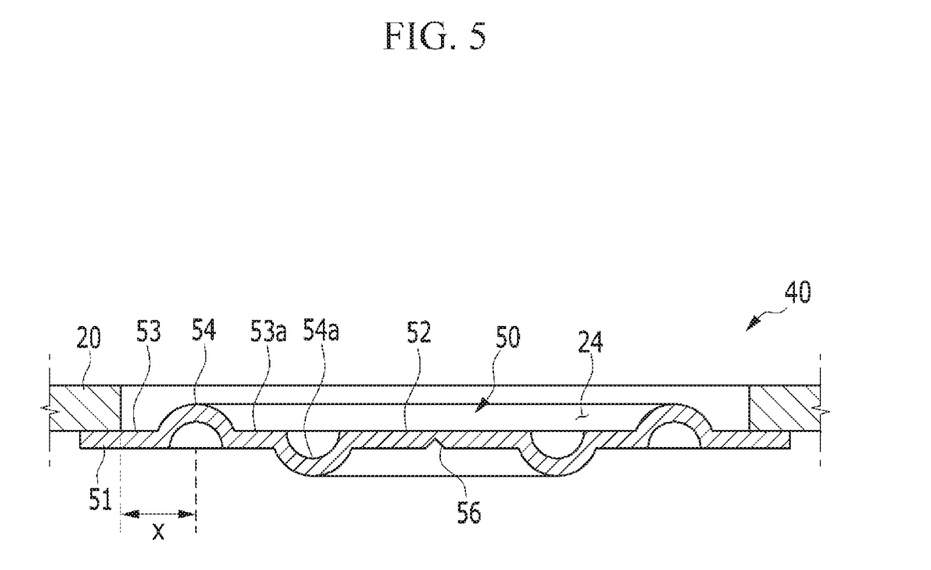
FIG. 5 illustrates a cross-sectional view of a second exemplary variation of the vent portion of the rechargeable battery shown in FIG. 1.

FIG. 4 illustrates a cross-sectional view of a first exemplary variation of the vent portion of the rechargeable battery shown in FIG. 1, and FIG. 5 illustrates a cross-sectional view of a second exemplary variation of the vent portion of the rechargeable battery shown in FIG. 1.

Referring to FIGS. 4 and 5, the vent plate 50 may include a plurality of bending portions 54 and 54a. In some embodiments, the plurality of bending portions 54 and 54a may be raised in the same direction. The plurality of bending portions 54 and 54a may be disposed between the vent hole 24 and the notch 56 formed at or near the center of the rupture portion 52. The bending portions 54 and 54a may be spaced from (e.g., spaced apart from) each other, thereby forming a second region 53a therebetween. The second region 53a may form (or serve as) a buffer region similar to the first region 53.

By providing (or sufficiently ensuring) buffer regions with the first region 53 and the second region 53a, when the rechargeable battery 100 (refer to FIG. 1) is dropped, or when the cap plate 20 is twisted (e.g., twisted by an unexpected external impact), impact energy transferred to the rupture portion 52 of the vent plate 50 may be reduced (or remarkably reduced). Accordingly, the rupture portion 52 of the vent plate 50 may not be easily ruptured.

Referring to FIG. 5, the plurality of bending portions 54 and 54a provided in the vent plate 50 may be alternately raised in opposing directions (or directions opposite to each other). When the plurality of bending portions 54 and 54a are alternately raised in opposing directions, it is possible to deal with various physical forces.

Figure 6:
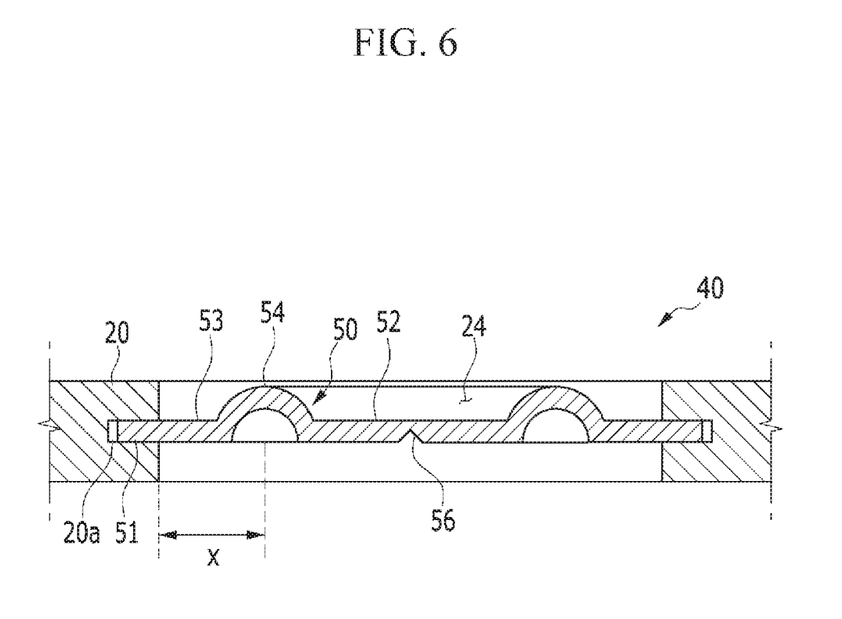
FIG. 6 illustrates a cross-sectional view of an exemplary variation of a connection between a cap plate and a vent plate of the vent portion of the rechargeable battery shown in FIG. 1.

FIG. 6 illustrates a cross-sectional view of an exemplary variation of a connection between the cap plate 20 and the vent plate 50 of the vent portion 40 of the rechargeable battery 100 shown in FIG. 1.

Referring to FIG. 6, the vent plate 50 may be inserted in (or connected to or coupled with) an insertion groove 20a formed in the cap plate 20. The insertion groove 20a may be formed in the cap plate 20 along the vent hole 24. The insertion groove 20a of the cap plate 20 may be formed to have a depth of about 1 mm or more. Accordingly, the connecting portion 51 of the vent plate 50 may be inserted into the insertion groove 20a to be connected thereto. While the vent plate 50 is inserted into the insertion groove 20a, the bending portion 54 may prevent the rupture portion 52 from rupturing, or reduce the likelihood thereof.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

Description of Some of the Symbols According to Exemplary Embodiments

| | |
|---|---|
| 100: rechargeable battery | 10: case |
| 20: cap plate | 20a: insertion groove |
| 22: first electrode terminal | 22a: insulating member |
| 23: second electrode terminal | 23b: connecting member |
| 24: vent hole | 25: electrolyte injection opening |
| 30: cap assembly | 40: vent portion |
| 50: vent plate | 51: connecting portion |
| 52: rupture portion | 53: first region |
| 53a: second region | 54, 54a: bending portion |
| 56: notch | X: first separation distance |

What is claimed is:

1. A rechargeable battery comprising:
an electrode assembly;
a case configured to accommodate the electrode assembly and having an opening at one side thereof; and
a cap assembly comprising:

a cap plate configured to close and seal the opening of the case, the cap plate having a vent portion and defining a vent opening that is configured to discharge an internal gas generated inside the case to outside of the case, the vent portion comprising:

a vent plate configured to close and seal the vent opening, the vent plate comprising:

a connecting portion located below the cap plate at the vent opening; and a rupture portion having a notch at a lower portion thereof, the notch facing inside the case; and a bending portion that is raised from the vent plate and encloses the rupture portion; and an electrode terminal at an upper portion of the cap plate and electrically connected to the electrode assembly.

2. The rechargeable battery of claim 1, wherein the bending portion is located between an outer periphery of the vent opening and the notch.

3. The rechargeable battery of claim 1, wherein a distance between a center of the bending portion and an outer periphery of the vent opening is greater than a length of the connecting portion.

4. The rechargeable battery of claim 1, wherein a height of the bending portion in a first direction is less than a thickness of the cap plate in the first direction, and wherein the height of the bending portion is greater than a thickness of the vent plate in the first direction.

5. The rechargeable battery of claim 1, wherein the bending portion comprises a plurality of bending portions.

6. The rechargeable battery of claim 5, wherein the plurality of bending portions are raised in a same direction.

7. The rechargeable battery of claim 5, wherein the plurality of bending portions are alternately raised in opposing directions.

8. The rechargeable battery of claim 1, wherein the notch is located near a center of the vent plate and has a thickness that is less than a thickness of the rupture portion in an inside direction of the case.

\* \* \* \* \*